(12) United States Patent
Roberts

(10) Patent No.: US 9,282,492 B2
(45) Date of Patent: *Mar. 8, 2016

(54) METHOD AND SYSTEM FOR TRANSITIONING BETWEEN RADIO ACCESS TECHNOLOGIES (RATS)

(71) Applicant: BlackBerry Limited, Waterloo (CA)

(72) Inventor: Gideon Roberts, Stone (GB)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/255,736

(22) Filed: Apr. 17, 2014

(65) Prior Publication Data

US 2014/0228033 A1   Aug. 14, 2014

Related U.S. Application Data

(63) Continuation of application No. 12/463,160, filed on May 8, 2009, now Pat. No. 8,730,909.

(60) Provisional application No. 61/052,192, filed on May 10, 2008.

(51) Int. Cl.
*H04W 36/00* (2009.01)
*H04W 36/02* (2009.01)
(Continued)

(52) U.S. Cl.
CPC .......... *H04W 36/0066* (2013.01); *H04W 36/02* (2013.01); *H04W 88/06* (2013.01); *H04L 1/1874* (2013.01); *H04W 36/14* (2013.01); *H04W 80/02* (2013.01)

(58) Field of Classification Search
CPC .............. H04L 1/1874; H04W 28/04; H04W 36/0066; H04W 36/02; H04W 36/14; H04W 80/02; H04W 88/06
USPC .................. 370/310, 328, 329, 331; 455/403, 455/422.1, 436
See application file for complete search history.

(56) References Cited

U.S. PATENT DOCUMENTS 6,693,910 B2 * 2/2004 Chao ............................ 370/394
6,963,745 B2 * 11/2005 Singh et al. ................... 455/437
(Continued)

FOREIGN PATENT DOCUMENTS

WO             0105121 A1    1/2001

OTHER PUBLICATIONS

3GPP TS 25.321 V5.12.0; 3rd Generation Partnership Project; Technical Specification Group Radio Access Network; Medium Access Control (MAC) Protocol Specification; Release 5; Sep. 2005; 57 pages.
(Continued)

*Primary Examiner* — Chi H Pham
*Assistant Examiner* — Robert Lopata
(74) *Attorney, Agent, or Firm* — Conley Rose, P.C.; J. Robert Brown, Jr.

(57) ABSTRACT

A method in a wireless communications device having a first protocol stack for use with a first radio access technology (RAT) and a second protocol stack for use with a second RAT, the first protocol stack comprising a reordering component associated with a first layer of the first protocol stack and arranged to implement a data reordering queue, the method for transitioning from the first RAT to the second RAT, the method comprising: determining that the device should transition from the first RAT to the second RAT; in response to determining that the device should transition, determining that data is present in a reordering queue implemented by the reordering component; sending the data present in the reordering queue to a second layer which is higher than the first layer; and attempting transitioning from the first RAT to the second RAT.

20 Claims, 5 Drawing Sheets

(51) Int. Cl.
*H04W 88/06* (2009.01)
*H04L 1/18* (2006.01)
*H04W 36/14* (2009.01)
*H04W 80/02* (2009.01)

(56) References Cited

U.S. PATENT DOCUMENTS

| | | | | |
|---|---|---|---|---|
| 7,072,663 B2 * | 7/2006 | Ramos et al. | | 455/453 |
| 7,251,227 B2 * | 7/2007 | de Jong et al. | | 370/331 |
| 7,318,187 B2 * | 1/2008 | Vayanos et al. | | 714/776 |
| 7,403,541 B2 * | 7/2008 | Yi et al. | | 370/469 |
| 7,706,405 B2 * | 4/2010 | Terry et al. | | 370/469 |
| 7,921,348 B2 * | 4/2011 | Seidel et al. | | 714/751 |
| 7,978,640 B2 * | 7/2011 | Lee et al. | | 370/313 |
| 8,085,726 B2 * | 12/2011 | Chao et al. | | 370/331 |
| 8,085,728 B2 * | 12/2011 | Chao et al. | | 370/331 |
| 8,130,724 B2 * | 3/2012 | DiGirolamo et al. | | 370/331 |
| 8,320,327 B2 * | 11/2012 | Pani et al. | | 370/331 |
| 2004/0052229 A1 * | 3/2004 | Terry et al. | | 370/335 |
| 2004/0208160 A1 * | 10/2004 | Petrovic et al. | | 370/350 |
| 2005/0180371 A1 * | 8/2005 | Malkamaki | | 370/342 |
| 2005/0276263 A1 * | 12/2005 | Suetsugu et al. | | 370/389 |
| 2006/0056365 A1 * | 3/2006 | Das et al. | | 370/338 |
| 2006/0088009 A1 * | 4/2006 | Gibbs et al. | | 370/338 |
| 2007/0081492 A1 * | 4/2007 | Petrovic et al. | | 370/331 |
| 2008/0080430 A1 * | 4/2008 | Choi et al. | | 370/332 |
| 2008/0098283 A1 * | 4/2008 | Vayanos et al. | | 714/774 |
| 2008/0107077 A1 * | 5/2008 | Murphy | | 370/331 |
| 2008/0188223 A1 * | 8/2008 | Vesterinen et al. | | 455/436 |
| 2008/0188224 A1 * | 8/2008 | Pani et al. | | 455/436 |
| 2008/0253375 A1 * | 10/2008 | Yi et al. | | 370/394 |
| 2009/0149189 A1 * | 6/2009 | Sammour et al. | | 455/450 |
| 2009/0175163 A1 * | 7/2009 | Sammour et al. | | 370/216 |
| 2009/0268635 A1 * | 10/2009 | Gallagher et al. | | 370/254 |
| 2010/0142612 A1 * | 6/2010 | van Rooyen | | 375/239 |
| 2010/0208668 A1 * | 8/2010 | Dumazy | | 370/329 |
| 2010/0215020 A1 * | 8/2010 | Lee et al. | | 370/331 |
| 2011/0069676 A1 * | 3/2011 | Perras et al. | | 370/331 |
| 2014/0362826 A1 * | 12/2014 | Chao et al. | | 370/331 |

OTHER PUBLICATIONS

ETSI TS 125 308 V7.6.0; Universal Mobile Telecommunications System (UMTS); High Speed Downlink Packet Access (HSDPA); Overall Description; Stage 2; (3GPP TS 25.308 version 7.6.0 Release 7); Apr. 2008; 54 pages.

Holma, Harri, et al.; "WCDMA for UMTS—HSPA Evolution and LTE"; XP-002544338; Fourth Edition 2007; 42 pages.

European Extended Search Report; EP Application No. 09159759.1; Sep. 17, 2009; 5 pages.

Office Action dated Aug. 16, 2011; U.S. Appl. No. 12/463,160, filed May 8, 2009; 16 pages.

Final Office Action dated Jan. 31, 2012; U.S. Appl. No. 12/463,160, filed May 8, 2009; 11 pages.

Advisory Action dated May 14, 2012; U.S. Appl. No. 12/463,160, filed May 8, 2009; 3 pages.

Office Action dated Jun. 26, 2012; U.S. Appl. No. 12/463,160, filed May 8, 2009; 12 pages.

Final Office Action dated Jan. 10, 2013; U.S. Appl. No. 12/463,160, filed May 8, 2009; 9 pages.

Advisory Action dated Mar. 13, 2013; U.S. Appl. No. 12/463,160, filed May 8, 2009; 3 pages.

Office Action dated Jul. 2, 2013; U.S. Appl. No. 12/463,160, filed May 8, 2009; 8 pages.

Notice of Allowance dated Jan. 15, 2014; U.S. Appl. No. 12/463,160, filed May 8, 2009; 8 pages.

Roberts, Gideon; U.S. Appl. No. 12/463,160, filed May 8, 2009; Title: Method and System for Transitioning Between Radio Access Technologies (RATS).

3GPP TS 25.308 V5.2.0; 3rd Generation Partnership Project; Technical Specification Group Radio Access Network; High Speed Downlink Packet Access (HSDPA); Overall Description; Stage 2; Release 5; Mar. 2002; 30 pages.

Indian Examination Report; Application No. 1046/CHE/2009; Aug. 25, 2014; 2 pages.

Canadian Office Action; Application No. 2,665,662; Oct. 18, 2011; 4 pages.

Canadian Office Action; Application No. 2,665,662; Mar. 19, 2013; 2 pages.

* cited by examiner

METHOD AND SYSTEM FOR TRANSITIONING BETWEEN RADIO ACCESS TECHNOLOGIES (RATS)

CROSS-REFERENCE TO RELATED APPLICATIONS

This application is a continuation of U.S. application Ser. No. 12/463,160 filed May 8, 2009 by Gideon Roberts, entitled "Method and System for Transitioning Between Radio Access Technologies (RATS)" (33678-US-PAT—4214-08601) which claims priority to U.S. Provisional Patent Application No. 61/052,192, filed May 10, 2008, by Gideon Roberts, entitled "Method and System for Transitioning Between Radio Access Technologies (RATS)" (33678-US-PRV—4214-08600), both of which are incorporated by reference herein as if reproduced in their entirety.

TECHNICAL FIELD

This application relates to telecommunication systems in general, having for example application in UMTS (Universal Mobile Telecommunications System) and in particular relates to a method and apparatus for transitioning from first to second radio access technologies (RATs).

BACKGROUND

In a typical cellular radio system, mobile user equipment (UE) communicates via a radio access radio network (RAN) to one or more core networks. User equipment (UE) comprises various types of equipment such as mobile telephones (also known as cellular or cell phones), lap tops with wireless communication capability, personal digital assistants (PDAs) etc. These may be portable, hand held, pocket sized, installed in a vehicle etc and communicate voice and/or data signals with the radio access network.

In the following, reference will be made to UMTS and to particular standards. However it should be understood that the disclosure is not intended to be limited to any particular mobile telecommunications system or standard.

The radio access network covers a geographical area divided into a plurality of cell areas. Each cell area is served by at least one base station, which in UMTS may be referred to as a Node B. Each cell is identified by a unique identifier which is broadcast in the cell. The base stations communicate at radio frequencies over an air interface with the UEs within range of the base station. Several base stations may be connected to a radio network controller (RNC) which controls various activities of the base stations. The radio network controllers are typically connected to a core network.

UMTS is a third generation public land mobile telecommunication system. Various standardization bodies are known to publish and set standards for UMTS, each in their respective areas of competence. For instance, the 3GPP (Third Generation Partnership Project) has been known to publish and set standards for GSM (Global System for Mobile Communications) based UMTS, and the 3GPP2 (Third Generation Partnership Project 2) has been known to publish and set standards for CDMA (Code Division Multiple Access) based UMTS. Within the scope of a particular standardization body, specific partners publish and set standards in their respective areas.

BRIEF DESCRIPTION OF THE DRAWINGS

Embodiments will now be described, by way of example only, with reference to the attached drawings, in which.

DETAILED DESCRIPTION OF THE DRAWINGS

Figure 1:
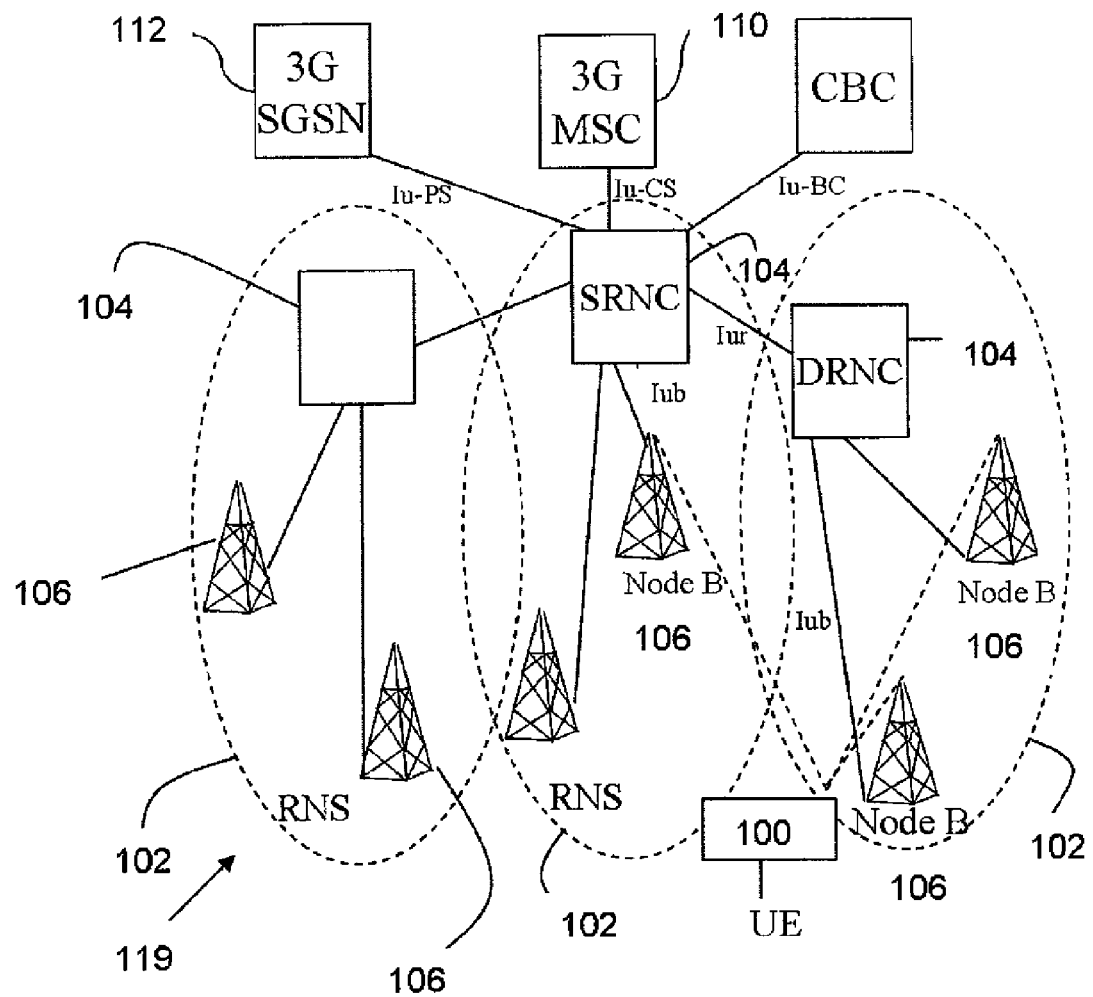
FIG. 1 is a schematic diagram showing an overview of a network and a UE device.

Consider a wireless mobile device, generally referred to as user equipment (UE), that complies with the 3GPP specifications for the UMTS protocol. The 3GPP 25.321 specification, v.5.12.0, referred to herein as the 25.321 specification, is incorporated herein by reference and specifies a protocol for Medium Access Control (MAC), including an entity termed the MAC-hs which handles functions specific to high-speed downlink packet access (HSDPA).

HSDPA is a protocol of the high-speed packet access (HSPA) family of protocols which extend the performance of the UMTS protocol. HSDPA uses techniques such as adaptive modulation and hybrid automatic repeat request (ARQ) to achieve high throughput, reduce delay and achieve high peak rates. It relies on a new type of transport channel termed the high-speed downlink shared channel (HS-DSCH), which is terminated in the Node B. The MAC layer is part of the UMTS access stratum and controls channel access. The MAC-hs in the MAC layer controls access to the HS-DSCH.

Behaviour of the MAC-hs entity is described in sections 4.2.3.3 and 11.6.2 of the 25.321 specification. One aspect of the MAC-hs entity is that it contains a reordering entity which attempts to put received data in the correct order before sending it to layers above the MAC layer. The reordering entity uses a reordering queue to store received protocol data units (PDUs) and when the correct sequence exists, the data is sent to the Radio Link Control (RLC) layer. A timer (T1) can also be configured to ensure that the MAC-hs entity does not wait too long before sending the PDUs to the RLC.

It has been identified that such reordering techniques may result in problems when an inter-RAT handover is performed, such as in the case of a handover from a 3G RAT such as UMTS including HSDPA to a 2G RAT such as GSM. There are thus proposed strategies for a method and apparatus for transitioning from a first RAT to a second. A number of such strategies are detailed below.

Other aspects and features of the proposed strategies will become apparent to those ordinarily skilled in the art upon review of the following description of specific embodiments of a method and apparatus for transitioning from a first RAT to a second RAT.

User equipment (UE) operating with HSDPA according to the 25.321 specification has a MAC-hs MAC entity which comprises reordering components for reordering PDUs to send these to a higher layer in the correct sequence. Each received MAC-hs PDU has an identifier known as a transmission sequence number (TSN). A reordering queue distribution function routes the MAC-hs PDUs to the correct reordering queue and a reordering entity reorders the PDUs according to the TSNs.

Section 11.6.2.3 of specification 25.321 specifies particular algorithms for the reordering by storage in the reordering queue and release from this buffer as appropriate for delivery to a disassembly entity to be sent to a higher layer. A timer T1 is specified. This enables correctly received PDUs to be delivered to the disassembly entity without too much delay, by specifying delivery on expiry of T1.

If a handover from HSDPA to another RAT is determined to be necessary, for example to a 2G RAT as UMTS is unavailable, use of a reordering queue and timer in the manner specified in specification 25.321 becomes problematic if there are PDUs in the reordering buffer when handover starts. This may result in loss and/or delay of data as during and after handover, the protocol stack is not in the correct state to deal with HSDPA data attempted to be released from the reordering buffer after being reordered.

According to the methods disclosed herein, on determination for such a UE that a transition from a first RAT to a second RAT is required, for example, because only a 2G RAT and not HSDPA is available, any data in the reordering queue may be flushed to a higher layer. For example, PDUs in a reordering queue in the MAC layer may be sent to the RLC layer. By flushing all correctly received data from the reordering queue before handover commences, data can be handled normally and will not be lost: if the handover completes successfully, data loss due to release of HSDPA data is avoided and if the handover fails to complete, delay in sending data to higher layers due to incomplete sending of data from the reordering queue during the handover attempt is avoided.

If the reordering entity has an associated timer, this may alternatively or additionally be stopped on determination that the transition is required. Stopping the timer before handover commences prevents expiry of the timer whilst the handover is in progress or after the handover is completed, so avoiding problems with higher layers incorrectly receiving data from the reordering queue on timer expiry during handover.

The methods disclosed herein thus prevent data loss in a wireless communications device during an inter-RAT handover from a first RAT which has a data reordering queue associated with a first layer of a first protocol stack for use with the first RAT, to a second RAT. Further, device implementation is simplified as data specific to the first RAT only needs to be handled during operation in the first RAT and not after a handover has started. This means that the first protocol stack, which is in the correct state for processing of the data from the reordering queue, is still in place whilst all this data is processed, thus avoiding the need for complex data processing by the second protocol stack to deal with data not yet sent to a higher layer after handover which the second protocol stack is not in the correct state to deal with.

The methods disclosed herein may be implemented in a user equipment device of a wireless communications network. Referring to the drawings, FIG. 1 is a schematic diagram showing an overview of a network and a user equipment device. Clearly in practice there may be many user equipment devices operating with the network but for the sake of simplicity FIG. 1 only shows a single user equipment device 100. For the purposes of illustration, FIG. 1 also shows a radio access network 119 (UTRAN) used in a UMTS system having a few components. It will be clear to a person skilled in the art that in practice a network will include far more components than those shown.

The network 119 as shown in FIG. 1 comprises three Radio Network Subsystems (RNS) 102. Each RNS has a Radio Network Controller (RNC) 104. Each RNS 102 has one or more Node B 102 which are similar in function to a Base Transmitter Station of a GSM radio access network. User Equipment UE 100 may be mobile within the radio access network. Radio connections (indicated by the straight dotted lines in FIG. 1) are established between the UE and one or more of the Node Bs in the UTRAN.

Figure 2:
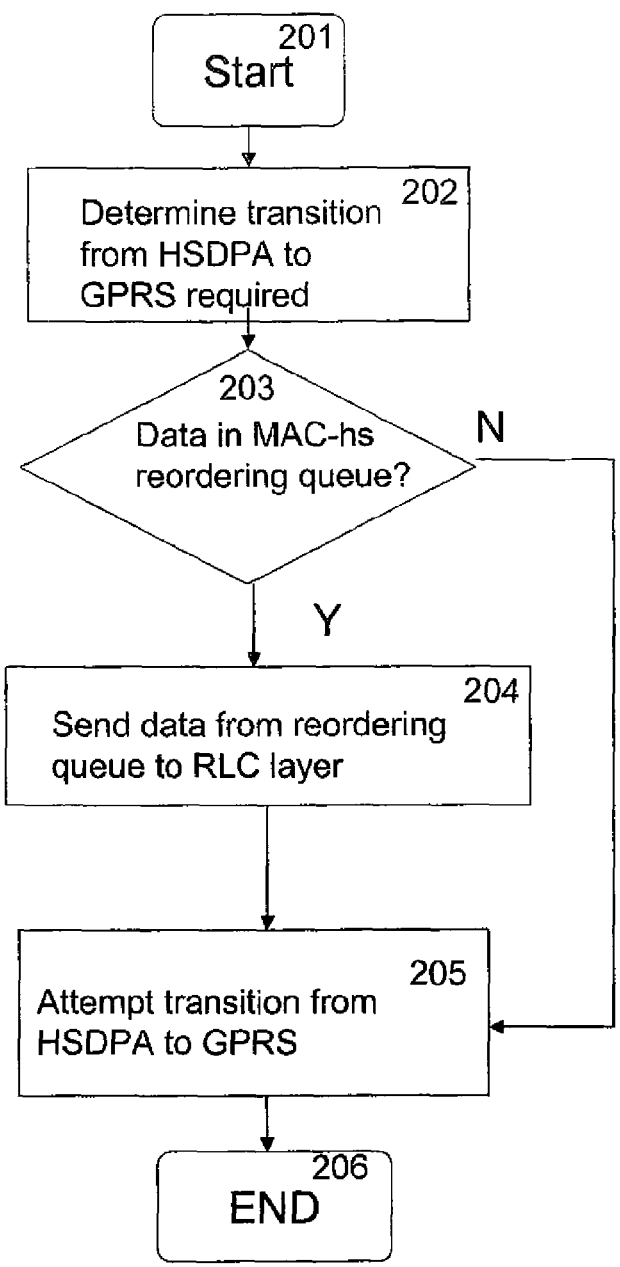
FIG. 2 is a flow diagram showing, at a high level, actions performed by the UE during a first example inter-RAT handover as described herein.
Figure 3:
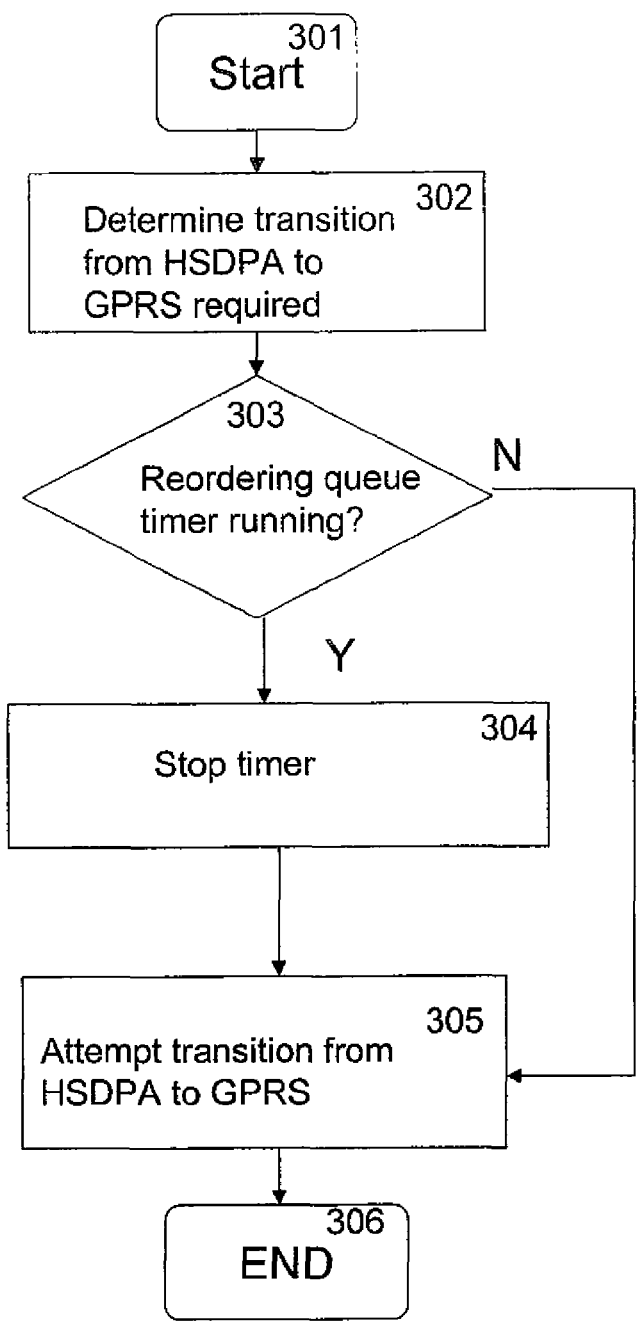
FIG. 3 is a flow diagram showing, at a high level, actions performed by the UE during a second example inter-RAT handover as described herein.
Figure 4:
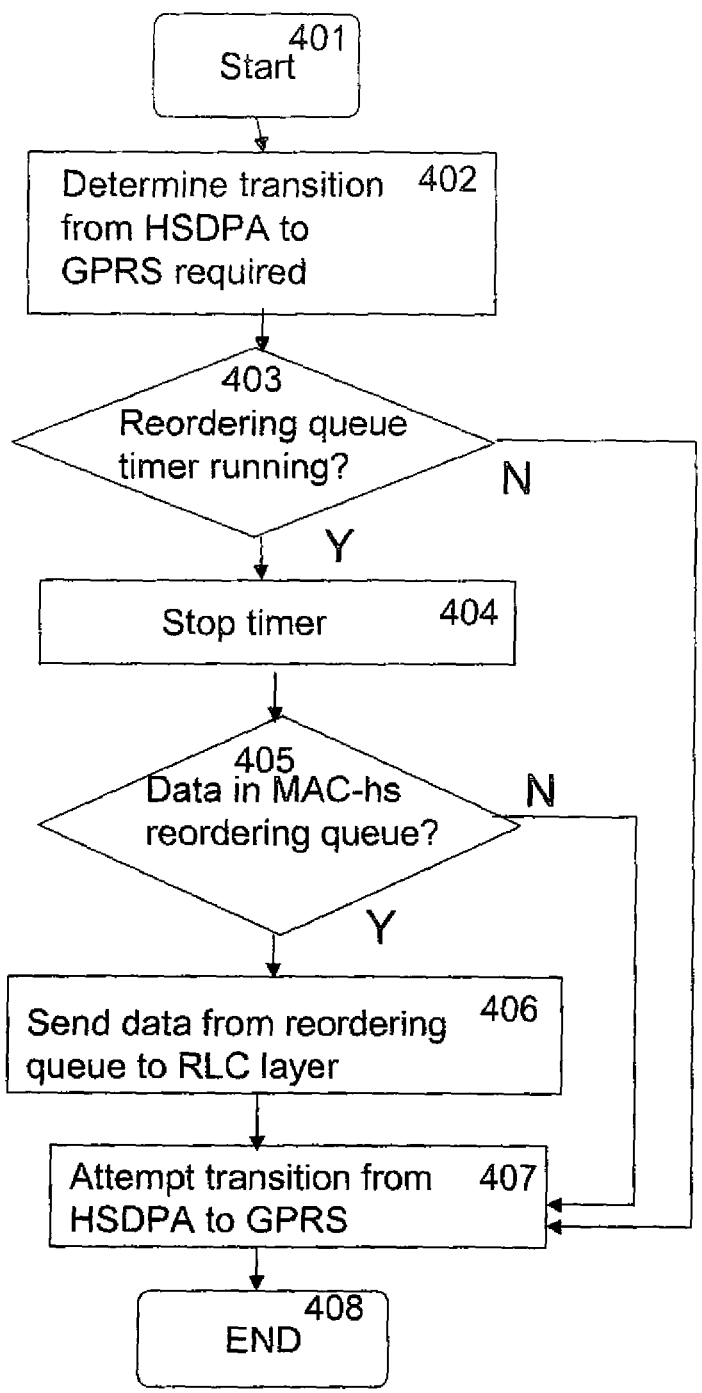
FIG. 4 is a flow diagram showing, at a high level, actions performed by the UE during a third example inter-RAT handover as described herein.

FIGS. 2 to 4 are flow diagrams showing, at a high level, actions performed by the UE during an example inter-RAT handover as described herein. FIG. 2 shows an inter-RAT handover where data is flushed from a reordering queue to a higher layer prior to a handover attempt, FIG. 3 shows a handover where a timer is stopped prior to a handover attempt and FIG. 4 shows a handover combining the techniques shown in FIG. 2 and FIG. 3.

Turning to FIG. 2, at 201 the method is initiated. At 202 it is determined that a transition from HSDPA to GPRS is required. At 203 it is determined whether there are any PDUs in the reordering queue. If the reordering queue is empty, transition from HSDPA to GPRS is attempted, at 205. If there are any PDUs in the reordering queue, these are flushed, at 204, to a higher layer, in this case a RLC layer. This occurs via the disassembly entity and another MAC entity known as the MAC-d entity, as described above and in the 25.321 specification. When the data has been flushed from the reordering queue, the transition is attempted at 205. This transition may be in any known manner. The method ends at 206 after the transition is attempted.

Turning to FIG. 3, at 301 the method is initiated. At 302 it is determined that a transition from HSDPA to GPRS is required. At 303 it is determined whether a timer is running associated with the reordering queue. If the timer is not running, transition from HSDPA to GPRS is attempted, at 305. If the timer is running it is stopped at 304 and then the transition is attempted at 305. This transition may be in any known manner. The method ends at 306 after the transition is attempted.

Turning to FIG. 4, at 401 the method is initiated. At 402 it is determined that a transition from HSDPA to GPRS is required. At 403 it is determined whether a timer is running associated with the reordering queue. If the timer is running, it is stopped at 404. If it is determined at 403 that the timer is not running this means that there must be no PDUs in the reordering queue, so the method moves to 407 to attempt handing over. If at 403 it is determined that the timer is running, at 404 the timer is stopped and the method moves to 405 where it is determined whether there are any PDUs in the reordering queue. If the reordering queue is empty, transition from HSDPA to GPRS is attempted, at 407. If there are any PDUs in the reordering queue, these are flushed, at 406, to a higher layer. When the data has been flushed from the reordering queue, the transition is attempted at 407. The method ends at 408 after the transition is attempted.

Figure 5:
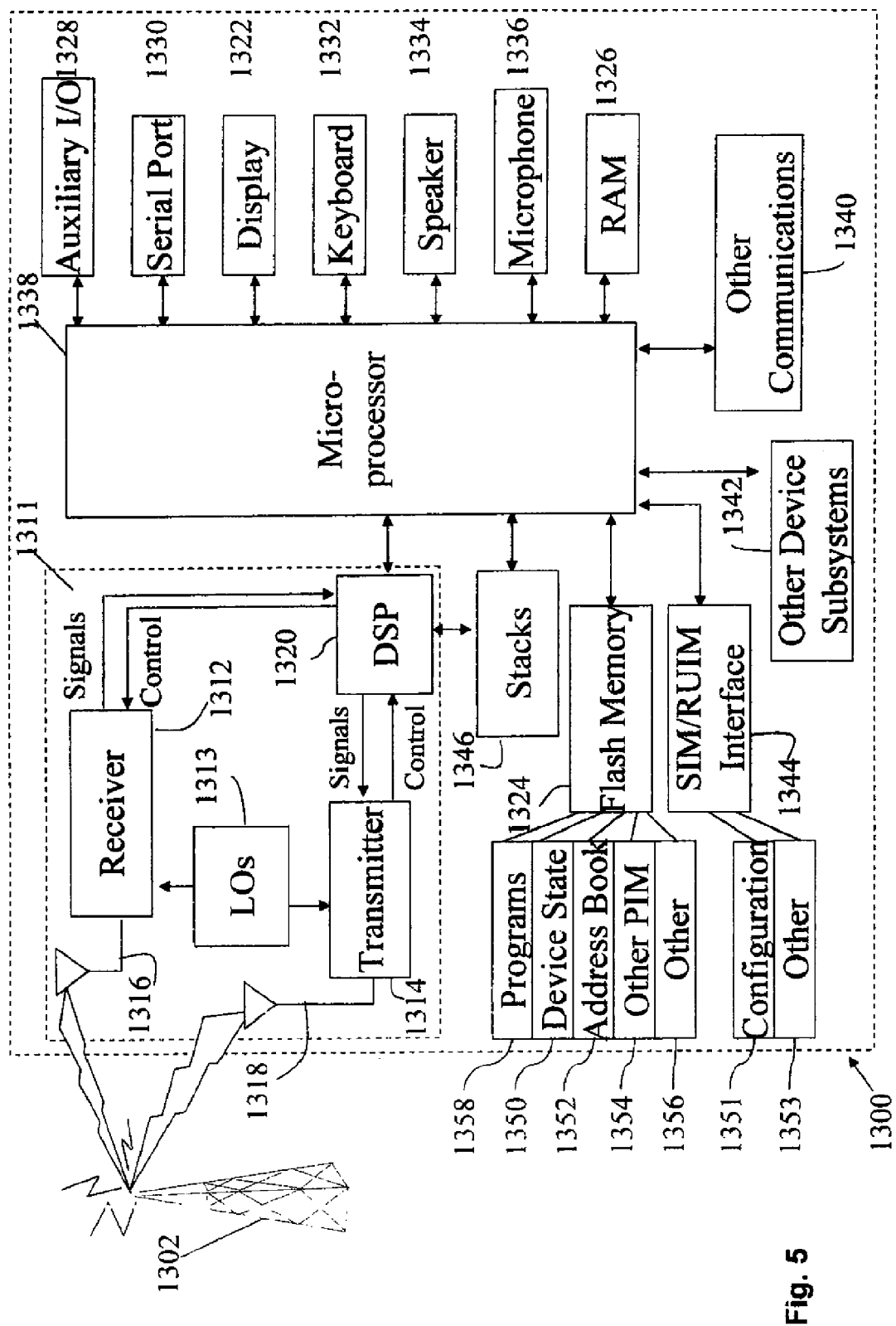
FIG. 5 is a block diagram illustrating a mobile device, which can act as a UE in accordance with the approach described herein.

Turning now to FIG. 5, FIG. 5 is a block diagram illustrating a mobile device, which can act as a UE and co-operate with the apparatus and methods of FIGS. 1 and 2, and which is an exemplary wireless communication device. Mobile station 1300 is preferably a two-way wireless communication device having at least voice and data communication capabilities. Mobile station 1300 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 1300 is enabled for two-way communication, it will incorporate a communication subsystem 1311, including both a receiver 1312 and a transmitter 1314, as well as associated components such as one or more, preferably embedded or internal, antenna elements 1316 and 1318, local oscillators (LOs) 1313, and a processing module such as a digital signal processor (DSP) 1320. As will be apparent to those skilled in the field of communications, the particular design of the communication subsystem 1311 will be dependent upon the communication network in which the device is intended to operate. For example, mobile station 1300 may include a communication subsystem 1311 designed to operate within the Mobitex™ mobile communication system, the DataTAC™ mobile communication system, GPRS network, UMTS network, or EDGE network.

Network access requirements will also vary depending upon the type of network 1302. For example, in the Mobitex and DataTAC networks, mobile station 1300 is registered on the network using a unique identification number associated with each mobile station. In UMTS and GPRS networks, however, network access is associated with a subscriber or user of mobile station 1300. A GPRS mobile station therefore requires a subscriber identity module (SIM) card in order to operate on a GPRS network. Without a valid SIM card, a GPRS mobile station will not be fully functional. Local or non-network communication functions, as well as legally required functions (if any) such as "911" emergency calling, may be available, but mobile station 1300 will be unable to carry out any other functions involving communications over the network 1302. The SIM interface 1344 is normally similar to a card-slot into which a SIM card can be inserted and ejected like a diskette or PCMCIA card. The SIM card can have approximately 64K of memory and hold many key configuration 1351, and other information 1353 such as identification, and subscriber related information.

When required network registration or activation procedures have been completed, mobile station 1300 may send and receive communication signals over the network 1302. Signals received by antenna 1316 through communication network 1302 are input to receiver 1312, which may perform such common receiver functions as signal amplification, frequency down conversion, filtering, channel selection and the like, and in the example system shown in FIG. 5 analog to digital (A/D) conversion. A/D conversion of a received signal allows more complex communication functions such as demodulation and decoding to be performed in the DSP 1320. In a similar manner, signals to be transmitted are processed, including modulation and encoding for example, by DSP 1320 and input to transmitter 1314 for digital to analog conversion, frequency up conversion, filtering, amplification and transmission over the communication network 1302 via antenna 1318. DSP 1320 not only processes communication signals, but also provides for receiver and transmitter control. For example, the gains applied to communication signals in receiver 1312 and transmitter 1314 may be adaptively controlled through automatic gain control algorithms implemented in DSP 1320.

Mobile station 1300 preferably includes a microprocessor 1338 which controls the overall operation of the device. Communication functions, including at least data and voice communications, are performed through communication subsystem 1311. Microprocessor 1338 also interacts with further device subsystems such as the display 1322, flash memory 1324, random access memory (RAM) 1326, auxiliary input/output (I/O) subsystems 1328, serial port 1330, keyboard 1332, speaker 1334, microphone 1336, a short-range communications subsystem 1340 and any other device subsystems generally designated as 1342.

Some of the subsystems shown in FIG. 5 perform communication-related functions, whereas other subsystems may provide "resident" or on-device functions. Notably, some subsystems, such as keyboard 1332 and display 1322, for example, may be used for both communication-related functions, such as entering a text message for transmission over a communication network, and device-resident functions such as a calculator or task list.

Operating system software used by the microprocessor 1338 is preferably stored in a persistent store such as flash memory 1324, which may instead be a read-only memory (ROM) or similar storage element (not shown). Those skilled in the art will appreciate that the operating system, specific device applications, or parts thereof, may be temporarily loaded into a volatile memory such as RAM 1326. Received communication signals may also be stored in RAM 1326.

As shown, flash memory 1324 can be segregated into different areas for both computer programs 1358 and program data storage 1350, 1352, 1354 and 1356. These different storage types indicate that each program can allocate a portion of flash memory 1324 for their own data storage requirements. Microprocessor 1338, in addition to its operating system functions, preferably enables execution of software applications on the mobile station. A predetermined set of applications that control basic operations, including at least data and voice communication applications for example, will normally be installed on mobile station 1300 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 1302. In a preferred embodiment, the PIM data items are seamlessly integrated, synchronized and updated, via the wireless network 1302, with the mobile station user's corresponding data items stored or associated with a host computer system. Further applications may also be loaded onto the mobile station 1300 through the network 1302, an auxiliary I/O subsystem 1328, serial port 1330, short-range communications subsystem 1340 or any other suitable subsystem 1342, and installed by a user in the RAM 1326 or preferably a non-volatile store (not shown) for execution by the microprocessor 1338. Such flexibility in application installation increases the functionality of the device and may provide enhanced on-device functions, communication-related functions, or both. For example, secure communication applications may enable electronic commerce functions and other such financial transactions to be performed using the mobile station 1300.

In a data communication mode, a received signal such as a text message or web page download will be processed by the communication subsystem 1311 and input to the microprocessor 1338, which preferably further processes the received signal for output to the display 1322, or alternatively to an auxiliary I/O device 1328. A user of mobile station 1300 may also compose data items such as email messages for example, using the keyboard 1332, which is preferably a complete alphanumeric keyboard or telephone-type keypad, in conjunction with the display 1322 and possibly an auxiliary I/O device 1328. Such composed items may then be transmitted over a communication network through the communication subsystem 1311.

For voice communications, overall operation of mobile station 1300 is similar, except that received signals would preferably be output to a speaker 1334 and signals for transmission would be generated by a microphone 1336. Alternative voice or audio I/O subsystems, such as a voice message recording subsystem, may also be implemented on mobile station 1300. Although voice or audio signal output is preferably accomplished primarily through the speaker 1334, display 1322 may also be used to provide an indication of the identity of a calling party, the duration of a voice call, or other voice call related information for example.

Serial port 1330 in FIG. 5, would normally be implemented in a personal digital assistant (PDA)-type mobile station for which synchronization with a user's desktop computer (not shown) may be desirable, but is an optional device component. Such a port 1330 would enable a user to set preferences through an external device or software application and would extend the capabilities of mobile station 1300 by providing for information or software downloads to mobile station 1300 other than through a wireless communication network. The alternate download path may for example be used to load an encryption key onto the device through a direct and thus reliable and trusted connection to thereby enable secure device communication.

Other communications subsystems 1340, such as a short-range communications subsystem, is a further optional component which may provide for communication between mobile station 1300 and different systems or devices, which need not necessarily be similar devices. For example, the subsystem 1340 may include an infrared device and associated circuits and components or a Bluetooth™ communication module to provide for communication with similarly enabled systems and devices.

The skilled reader will appreciate that any appropriate manner for implementing the additional actions described above at the UTRAN or UE can be adopted in hardware, software or firmware. For example the additional identification or acknowledgement actions can be implemented at the respective components in any appropriate manner.

EXTENSIONS AND ALTERNATIVES

In the foregoing specification, the disclosure has been described with reference to specific embodiments thereof. It will, however, be evident that various modifications and changes may be made thereto without departing from the scope of the technique. The specification and drawings are, accordingly, to be regarded in an illustrative rather than a restrictive sense.

It is to be noted that the methods as described have actions being carried out in a particular order. However, it would be clear to a person skilled in the art that the order of any actions performed, where the context permits, can be varied and thus the ordering as described herein is not intended to be limiting.

It is also to be noted that where a method has been described it is also intended that protection is also sought for a device arranged to carry out the method and where features have been claimed independently of each other these may be used together with other claimed features.

It will further be understood that the method and apparatus described herein can be applied in relation to any release or similar procedure following actions as set out in any appropriate standard and between any appropriate user equipment components and access network components or indeed between components of a similar nature in any case where power between links in respect of directions is controlled by the link channel in the opposite direction where either can be an uplink or downlink.

Furthermore it will be noted that the apparatus described herein may comprise a single component such as a UE or UTRAN or other user equipment or access network components, a combination of multiple such components for example in communication with one another or a sub-network or full network of such components.

What is claimed is:

1. A method in a wireless communications device having a first protocol stack for use with a first radio access technology and a second protocol stack for use with a second, different, radio access technology, the first protocol stack comprising a reordering component associated with a first layer of the first protocol stack and arranged to implement a data reordering queue, the method for performing a handover from the first radio access technology to the second radio access technology, the method comprising:
    determining that the device should perform a handover from the first radio access technology to the second radio access technology;
    in response to determining that the device should perform a handover and before handover commences:
        determining that data is present in a reordering queue implemented by the reordering component; and
        sending the data present in the reordering queue to a second layer of the first protocol stack which is higher than the first layer of the first protocol stack; and
    thereafter attempting a handover from the first radio access technology to the second radio access technology.

2. A method according to claim 1, wherein the first protocol stack comprises a timer associated with the reordering component and the method further comprises:
    in response to determining that the device should perform a handover, determining that the timer is running; and
    stopping the timer.

3. A method according to claim 1, wherein the first radio access technology is a 3G access technology.

4. A method according to claim 3, wherein the first radio access technology is UMTS.

5. A method according to claim 4, wherein the first radio access technology is HSPA.

6. A method according to claim 5, wherein the first radio access technology is HSDPA.

7. A method according to claim 1, wherein the first layer is a Medium Access Control (MAC) layer.

8. A method according to claim 7, wherein the reordering component is a reordering entity comprised by a MAC-hs entity.

9. A method according to claim 1, wherein the second layer is a Radio Link Control layer.

10. A method according to claim 1, wherein the second radio access technology is a 2G access technology.

11. A method according to claim 10, wherein the first radio access technology is one of GSM and GPRS.

12. A wireless communications device having a first protocol stack for use with a first radio access technology, a second protocol stack for use with a second, different, radio access technology, the first protocol stack comprising a reordering component associated with a first layer of the first protocol stack and arranged to implement a data reordering queue, and a processor operable according to a computer program to cause the wireless communications device to:
    determine that the device should perform a handover from the first radio access technology to the second radio access technology;
    in response to determining that the device should perform a handover and before handover commences:
        determine that data is present in a reordering queue implemented by the reordering component; and
        send the data present in the reordering queue to a second layer of the first protocol stack which is higher than the first layer of the first protocol stack; and thereafter attempt a handover from the first radio access technology to the second radio access technology.

13. A computer program product comprising program code stored on a non-transitory computer readable medium for use in a wireless communications device, the wireless communications device having a first protocol stack for use with a first radio access technology and a second protocol stack for use with a second, different, radio access technology, the first protocol stack comprising a reordering component associated with a first layer of the first protocol stack and arranged to implement a data reordering queue, the computer program arranged, in use, to cause the wireless communications apparatus to:
- determine that the device should perform a handover from the first radio access technology to the second radio access technology;
- in response to determining that the device should perform a handover and before handover commences:
  - determine that data is present in a reordering queue implemented by the reordering component; and
  - send the data present in the reordering queue to a second layer of the first protocol stack which is higher than the first layer of the first protocol stack; and
- thereafter attempt a handover from the first radio access technology to the second radio access technology.

14. A method according to claim 1, further comprising: before handover commences processing in the first protocol stack the data sent to the second layer; and thereafter attempting a handover from the first radio access technology to the second radio access technology.

15. The device according to claim 12, wherein the first protocol stack comprises a timer associated with the reordering component and in which the processor is further operable according to a computer program to cause the wireless communications device to:
- in response to determining that the device should perform a handover, determine that the timer is running; and
- stop the timer.

16. The device according to claim 12, wherein the first radio access technology is a 3G access technology.

17. The device according to claim 12, wherein the first radio access technology is UMTS.

18. The device according to claim 12, wherein the first radio access technology is HSPA.

19. The device according to claim 12, wherein the first radio access technology is HSDPA.

20. A product according to claim 13, wherein the first layer is a Medium Access Control layer.

* * * * *